United States Patent [19]

Cash et al.

[11] 4,436,977

[45] Mar. 13, 1984

[54] INERT GAS DISTRIBUTOR ATTACHMENT FOR ARC WELDING TORCHES

[76] Inventors: Daniel L. Cash, Rte. 2 Box 667, Corbett, Oreg. 97019; Frank L. Stoddard, 3510 NE. Dorchester Way, Corvallis, Oreg. 97330

[21] Appl. No.: 327,700

[22] Filed: Dec. 4, 1981

[51] Int. Cl.³ .............................................. B23K 9/16
[52] U.S. Cl. ........................................ 219/75; 219/72
[58] Field of Search ............... 219/72, 74, 75, 137.31, 219/137.42; 403/159, 121, 157

[56] References Cited

U.S. PATENT DOCUMENTS

| | | | |
|---|---|---|---|
| 918,225 | 4/1909 | Townley | 403/159 |
| 2,856,510 | 10/1958 | Jones et al. | 219/74 |
| 2,866,074 | 12/1958 | Ronay | 219/74 |
| 3,868,489 | 2/1975 | Ayers | 403/157 |
| 3,875,364 | 4/1975 | Boyett | 219/74 |
| 4,005,305 | 1/1977 | Nelson et al. | 219/72 |

*Primary Examiner*—Roy N. Enval, Jr.
*Assistant Examiner*—Catherine M. Sigda
*Attorney, Agent, or Firm*—Oliver D. Olson

[57] ABSTRACT

An elongated hollow housing is attached to an inert gas arc welding torch in a position extending rearwardly of the electrode parallel to and trailing the direction of movement of the torch during welding, and a source of inert gas is coupled to the interior of the housing. The housing serves to distribute inert gas over a sufficient length of produced weld extending from and trailing the puddle of molten metal that said length of weld is protected with inert gas until it is cooled to a temperature at which is not adversely affected by atmospheric oxygen and nitrogen. The housing may be completely open at its side facing the work to be welded, or said side may be formed as a perforated wall. Also, said side may be contoured to substantially match the contour of the work to be welded.

6 Claims, 5 Drawing Figures

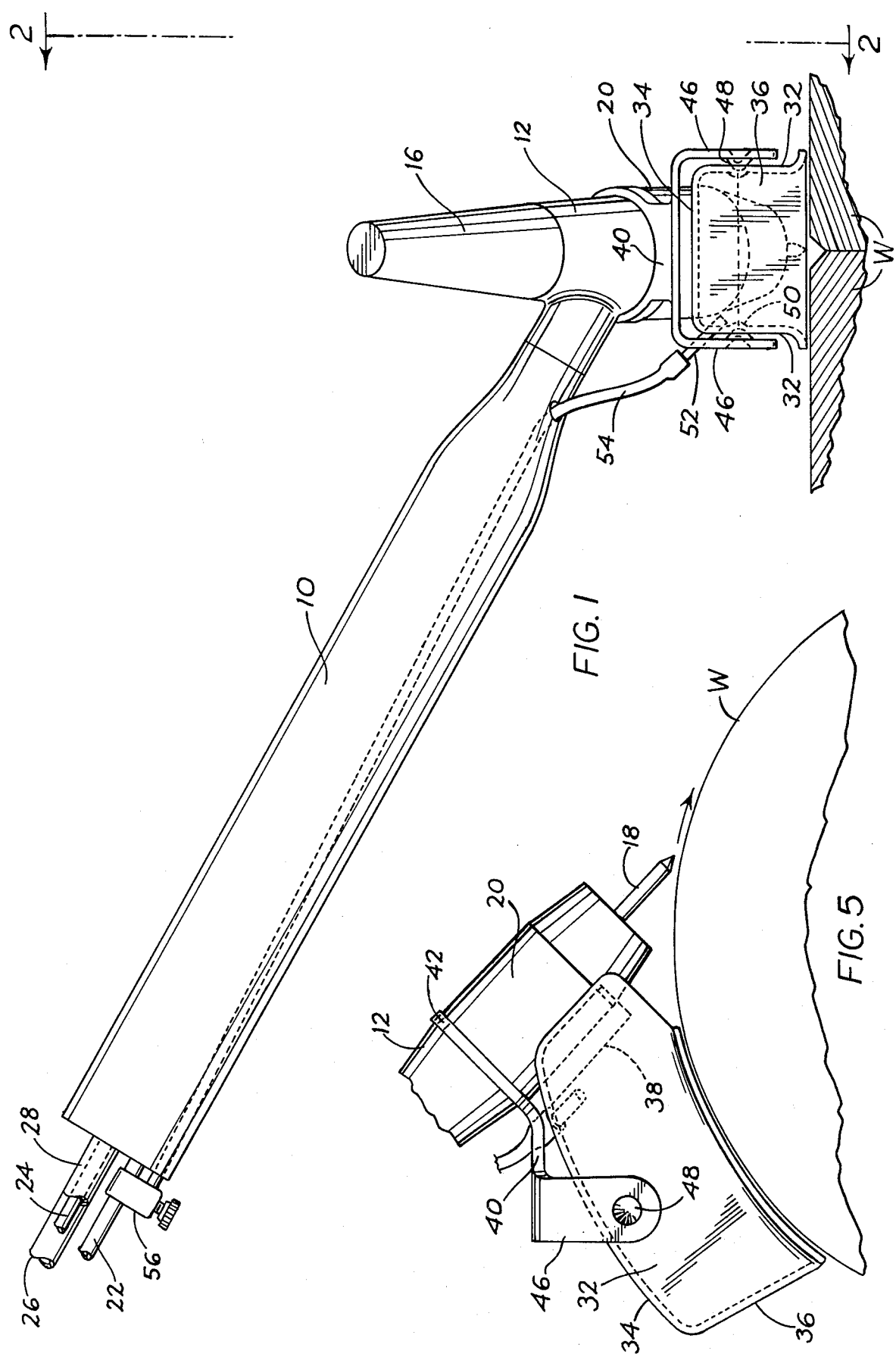

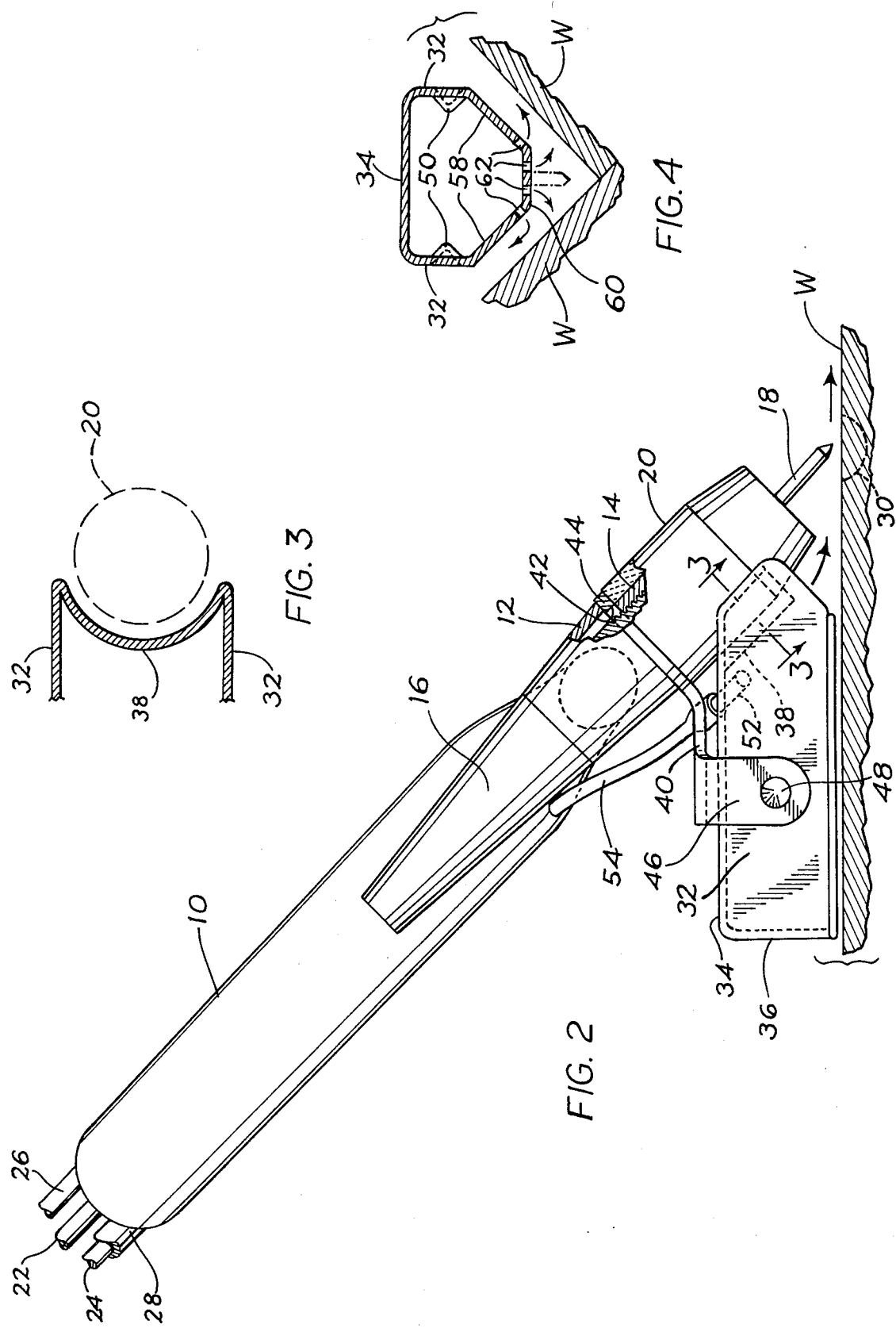

INERT GAS DISTRIBUTOR ATTACHMENT FOR ARC WELDING TORCHES

BACKGROUND OF THE INVENTION

This invention relates to inert gas arc welding, and more particularly to an attachment for inert gas arc welding torches by which to prolong the protection of the weld area by inert gas until the weld area is cooled to a temperature at which it is not adversely affected by atmospheric oxygen and nitrogen.

Inert gas arc welding is well known in the art, both as non-consumable tungsten (TIG) and as consumable metal electrode (MIG) configurations. In both types, argon, helium or other inert gas is directed in a limited area around the electrode to keep the molten puddle area flooded with inert gas, to the exclusion of atmospheric oxygen and nitrogen, to prevent the formation of metal oxides and nitrides and consequent degradation of a physical and metallurgical properties of the weld. Typical illustrations of these are found in U.S. Pat. Nos. 2,777,928; 3,172,992; 3,588,424; 3,689,725; 3,826,888 3,838,243; and 4,166,940.

In some instances, product specifications allow cleaning of the weld by grinding and wiring brushing, even though such treatment is time consuming and admits of degradation of the weld. In other instances, particularly with refractory metals, the purity of the weld must be so high that extraordinary measures must be taken to substantially eliminate the possibility of atmospheric contamination. This has been accomplished heretofore by the use of specially constructed chambers designed to house relatively small size work for welding and capable of being filled with inert gas. This is a costly, awkward and time consuming procedure. Large work pieces, incapable of being contained within such chambers, are protected by specially constructed tooling arranged to extend along and adjacent both sides of the weld line and to deliver inert gas to side line during welding. This is a costly procedure since the tooling is useable only for the particular welding job to be done. Moreover, it is a time consuming procedure and it often results in scratching or otherwise marring the workpiece.

SUMMARY OF THE INVENTION

In its basic concept, this invention provides for the distribution of an inert gas over a sufficient length of weld immediately trailing the welding puddle to allow said trailing weld to cool to a temperature at which it is not adversely affected by atmospheric oxygen and nitrogen.

It is the principal object of this invention to overcome the aforementioned disadvantages and limitation associated with prior art inert gas arc welding procedures and equipment.

Another object of this invention is the provision of an attachment for conventional inert gas arc welding torches by which to achieve the basic concept set forth hereinbefore.

Still another object of this invention is to provide an inert gas distributor attachment in the form of a hollow housing mounted removably on a conventional torch in a position trailing the direction of movement of the torch during welding and disposed closely adjacent to work being welded.

A further object of this invention is the provision of an attachment of the class described in which the hollow housing is readily replaceable with other housings of different shapes for use with different shapes of work surfaces to be welded.

A still further object of this invention is the provision of an attachment of the class described which includes a housing support bracket arranged to accommodate quick removal and replacement of the housing without the necessity of removing the bracket from the torch.

Another object of this invention is the provision of an attachment of the class described which is of simplified construction for economical manufacture.

The foregoing and other objects and advantages of this invention will appear from the following detailed description, taken in connection with the accommpanying drawings of preferred embodiments.

BRIEF DESCRIPTION OF THE DRAWINGS

FIG. 1 is a rear side elevation of a conventional form of TIG torch having mounted thereon an inert gas distributor attachment embodying the features of this invention.

FIG. 2 is a front side elevation as viewed in the direction of the arrows 2—2 in FIG. 1, a portion being broken away to disclose details of internal construction.

FIG. 3 is a fragmentary sectional view taken on the line 3—3 in FIG. 2.

FIG. 4 is a transverse section showing a modified shape of housing for use in welding metal plates disposed at right angles to each other.

FIG. 5 is a fragmentary front side elevation, similar to FIG. 2, showing a still further modified shape of housing for use in welding a curved surface.

DESCRIPTION OF THE PREFERRED EMBODIMENT

Referring particularly to FIGS. 1 and 2 of the drawings, there is shown for purposes of illustration a conventional form of TIG torch with which the attachment of this invention may be associated. The torch includes an elongated hollow handle 10 connected at its front end to a hollow head 12. Within the head is clamp mechanism 14 operable by a rotatable cap 16 to adjustably secure an elongated electrode 18 in any desired degree of extension from the forward end of the torch.

Also secured to and surrounding the projecting portion of the clamp mechanism is a ceramic cup 20. Interengaging threads on the clamp mechanism and cup allows removal of the cup, as is well known. Also, as is well known, the cup mounts a transverse internal screen which function to disperse inert gas in a uniform flow around and closely adjacent the projecting electrode.

Inert gas is introduced into the hollow head, and thence to the hollow cup, from an elongated flexible tube 22 which extends through the hollow handle for connection to a source of argon, helium or other appropriate inert gas under pressure. Electric current for the electrode is supplied by an electrical conductor 24 which also extends through the hollow handle for connection to a suitable source of electric potential. Circulating cooling water for the torch is supplied by a pair of flexible tubes 26 and 28 which extend through the hollow handle for connection to a source of cooling water. As shown, the conductor 24 extends through the water tube 28.

As previously mentioned, the foregoing conventional inert gas arc welding torch provides a flow of inert gas closely adjacent and surrounding the electrode so as to provide the welding puddle 30 of molten metal with an overlying blanket of inert gas and thus exclude atmospheric oxygen and nitrogen from the puddle area. However, it has also been explained hereinbefore that such protection is insufficient to prevent atmospheric contamination of the produced weld extending from the puddle in the direction trailing the movement of the torch during the welding process, because the produced weld trailing from the puddle still is at a sufficiently elevated temperature as to react chemically with the oxygen and nitrogen components of the air to form oxides and nitrides which degrade the physical and metallurgical properties of the weld.

In accordance with the present invention, an attachment is provided for extending the distribution of inert gas along a sufficient length of the produced weld trailing the welding puddle, as to insure that the temperature of the produced weld is reduced to a degree at which it no longer is affected adversely by atmospheric oxygen and nitrogen.

Referring first to FIGS. 1 and 2 of the drawings, the illustrated attachment includes a hollow elongated housing defined by laterally spaced side walls 32, top wall 34, rear wall 36 and partial front wall 38. The bottom of the housing is open, although it may be fitted with a transverse perforate screen by which to enhance the dispersion of inert gas. In the embodiment illustrated, the side walls flare arcuately downward to the open bottom side, to provide a smooth contact surface for sliding engagement with the surface of work to be welded.

The partial front wall of the housing is arcuate in cross-section (FIG. 3) for freely receiving therein the ceramic cup or other forward portion of the torch.

The hollow housing is supported by the torch for movement therewith. In the embodiment illustrated, this support is provided by a bracket 40 one end portion of which is provided with an opening 42 dimensioned to slidably receive therethrough the forwardly projection portion of the electrode clamp 14. The annular collar 44 surrounding and defining the opening thus is captured between the forwardly facing shoulder end of the hollow head 12 and the confronting shoulder face of the ceramic cup 20. By threading the cup onto the clamp mechanism the annular collar is clamped securely but releasably to the torch.

The opposite end portion of the bracket projects rearwardly from the torch, i.e. in the trailing direction of movement of the torch during welding, and is provided with a pair of laterally spaced downwardly projecting resilient tabs 46. Each tab is provided with a detent 48 projecting inwardly toward the other. The side walls 32 of the housing are indented to form sockets 50 arranged to releasably receive the detents on the flanges and thus support the housing on the bracket in the position aligned with and trailing the direction of movement of the electrode 18 during welding. It is by this means that the housing thus straddles the weld line as the torch is moved during the welding procedure.

Inert gas is introduced into the interior of the housing. In the preferred embodiment illustrated, this is achieved by providing an inlet fitting 52 supported by one wall of the housing and communicating at its inner end with the interior of the housing. The outer end of the fitting mounts one end of a length of flexible tubing 54 which extends rearwardly through the hollow handle 10 for coupling to the inert gas delivery tube 22. In the preferred embodiment illustrated this coupling is provided by means of an adjustable valve 56 which serves to adjust the flow of inert gas to the hollow head of the torch and to the hollow housing. In this regard, it has been found that the ratio of one-third of the inert gas delivered to the housing and two-thirds delivered to the hollow head is quite satisfactory. However, other diverse ratios may be employed as desired for specific applications.

It is to be noted that the inert gas delivered to the trailing housing also exits the latter through the opening under the partial wall 38 to effectively flood the area of the weld immediately trailing the moulten puddle.

It is also to be noted, particularly from FIG. 2 of the drawings, that the detent mounting of the housing allows the housing to pivot on the common axis of the detents. This allows the operator to adjust the angle of the torch, within limits, as may be desired or required, while maintaining the bottom end of the housing closely adjacent or in sliding contact with the surface of the work being welded. This insures against the sucking of atmospheric air into the area of the weld line.

Referring now to FIG. 4 of the drawings, the housing is shown in cross-section to be provided with a bottom wall having two laterally spaced downwardly converging sections 58 and a central bottom bridging section 60. A multiplicity of openings 62 are provided through the bridging section and the side sections closely adjacent to the bridging section. As illustrated, this configuration is particularly well suited for use in welding together two pieces of metal W disposed at right angles to each other since the arrangement of openings insures the effective flooding of the weld area with inert gas. It will be understood, of course, that the shape of the bottom wall may be varied to accommodate the welding of plates disposed at angles other than right angles.

In the embodiment illustrated in FIG. 5, the bottom edges of the side walls 32 of the housing illustrated in FIG. 1 are curved arcuately to conform substantially to the curvature of a large pipe or other curved work piece W to be welded. As in the earlier described embodiments, the bottom of the housing is open, either completely or by means of a perforate wall. If desired, the housing may contain steel wool or mesh screen material to effect more uniform distribution of the inert gas over the work area.

It will be apparent to those skilled in the art that the foregoing and other modifications and changes may be made in the size, shape, type, number and arrangement of parts described without departing from the spirit of this invention and the scope of the appended claims.

Having now described our invention and the manner in which it may be used, we claim:

1. For use with an inert gas arc welding torch, an inert gas distributor comprising:
   (a) a hollow housing having an open bottom side,
   (b) gas inlet means on the housing for communicating a source of inert gas with the interior of the housing for exit through said open bottom side, and
   (c) support means pivotally engaging the housing for supporting the same,
   (d) the support means being arranged for mounting on an inert gas arc welding torch to dispose the housing adjacent the torch electrode and trailing the direction of movement of the torch during welding for directing inert gas over a sufficient length of produced weld to allow the weld to cool to a temperature at which it is not substantially adversely effected by atmospheric oxygen and nitrogen, (e) the pivotal engagement of the support means with the housing being arranged to allow pivotal movement of the torch relative to the housing on an axis substantially perpendicular to the direction of movement of the torch during welding for adjusting the angle of the torch while maintaining the open bottom end of the housing closely adjacent or in sliding contact with the surface of the work being welded.

2. The inert gas distributor of claim 1 wherein the support means includes a pair of laterally spaced tabs arranged to receive the opposite side walls of the housing between them and cooperating detent and socket means on the tabs and housing side walls arranged for releasable pivotal interengagement for detachably supporting the housing by said tabs.

3. The inert gas distributor of claim 1 wherein the torch includes a pair of components connected together removably by interengaging threads and providing confronting shoulders between said components, and the support means comprises a bracket having an apertured section defining an annular collar, the apertured section being arranged to be interposed between said pair of components of the torch for clamping the annular collar between the confronting shoulders of said components.

4. The inert gas distributor of claim 7 wherein the bracket includes a pair of laterally spaced tabs arranged to receive the opposite side walls of the housing between them, and cooperating detent and socket means on the tabs and housing side walls arranged for releasable pivotal interengagement for detachably supporting the housing by said tabs.

5. The inert gas distributor of claim 1 wherein the torch includes a hollow elongated handle and an inert gas inlet tube extending longitudinally through said handle to deliver inert gas to the area surrounding the torch electrode, and the gas inlet means includes a second inert gas inlet tube arranged to extend longitudinally through the handle and to be connected to the first named inlet tube for delivering inert gas to the interior of the housing.

6. The inert gas distributor of claim 5 including control valve means arranged to connect the first and second inert gas inlet tubes to a common source of inert gas for regulating the volumes of inert gas delivered to the electrode area and housing.

* * * * *